June 27, 1933.  F. J. DONOVAN  1,916,040
PROCESS AND CONTAINER FOR PREVENTING THE DISCOLORATION OF CRAB MEAT
Filed Dec. 15, 1932

WITNESSES
Geo. W. Naylor
A. W. Foster

INVENTOR
Frank J. Donovan
BY
Munn, Anderson, Stanley, Foster & Liddy.
ATTORNEYS

Patented June 27, 1933

1,916,040

UNITED STATES PATENT OFFICE

FRANK J. DONOVAN, OF NEW YORK, N. Y., ASSIGNOR TO NATHAN HIRSCH, OF NEW YORK, N. Y.

PROCESS AND CONTAINER FOR PREVENTING THE DISCOLORATION OF CRAB MEAT

Application filed December 15, 1932. Serial No. 647,451.

This invention relates to a process and container for preventing discoloration of crab meat, and has particularly to do with a can or container having a lining or interior coating of vegetable lacquer which prevents the crab meat from discoloration due to chemical action within the can or container.

The can is of tin or similar metal, and the vegetable lacquer consists of a mixture of glyptal resin, combined linseed and China-wood oils, with petroleum and some cobalt, which is preferably applied to the metal before the can is formed, although it may be otherwise disposed on the interior of the can and cover for the can, so as to provide a thin lining or coating which counteracts the iron sulphide present in the tin, and which is responsible for the discoloration of fresh crab meat.

It is to be borne in mind that crab meat has a certain sulphide content which, in contact with iron sulphide, tends to and does discolor the crab meat, and it is, of course, of vital importance to deliver the crab meat in the original package without discoloration and without deterioration, and this I accomplish by my improved lining or coating.

In the accompanying drawing,—

Figure 1:
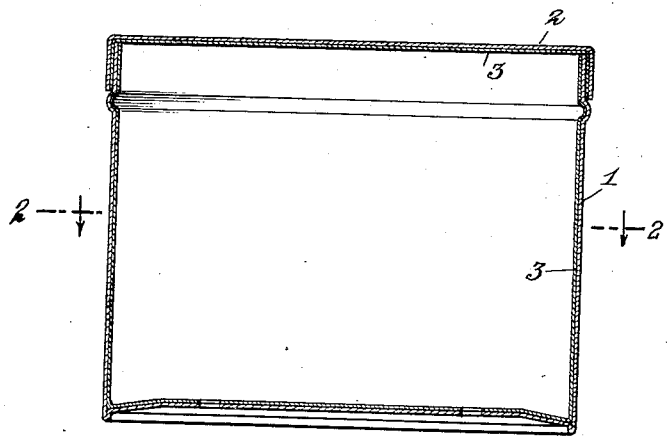
Figure 1 is a view in vertical or longitudinal section through a can or container embodying my invention.
Figure 2:
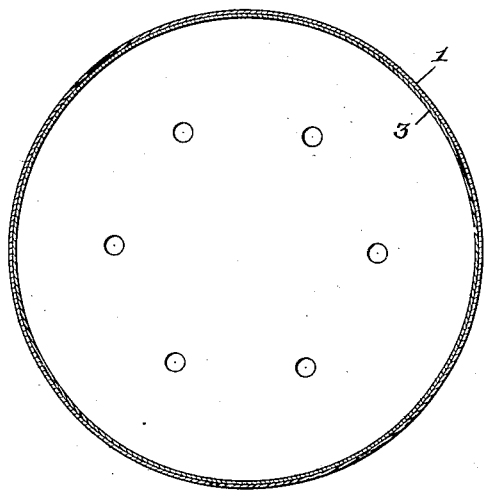
Figure 2 is a view in transverse section on the line 2/2 of Figure 1.

It is, of course, to be understood that the invention is not limited to the size, shape or form of can or container, but for purposes of illustration we will assume that the can, which is of tin, has a suitable tight fitting cover thereon.

This can 1 and cover 2 are provided with an internal lining 3 which is in the nature of a film of vegetable lacquer which is baked onto the metal and may be baked on the metal before the can is formed.

While, of course, I do not wish to be limited to the precise details or specific ingredients, it is to be understood that equivalents may be employed, but a preferable vegetable lacquer consists of the following:

Glyptal resin, 20%; combined linseed and China-wood oil, 40%; petroleum thinner, 40%, to which must be added the necessary amount of cobalt drier to form a film.

This lacquer is preferably sprayed onto the tin plates and baked at from 250 to 375° F. to drive off all odors and give a flint-like hardness to the film or coating on the metal. It is, therefore, to be understood that in employing the term "vegetable lacquer" I employ this language to define a composition substantially as above indicated, and as I believe I am the first to employ such a vegetable lacquer in a can or container of this type I desire to cover the idea broadly as expressed in the following claims.

I claim:

1. The herein described process of preventing discoloration of crab meat in metal containers which comprises the coating of the entire inner surface of the container with a lacquer having a glyptal resin base which is a non-conductor of electricity which is impervious to the moisture of the crab meat and which contains no ingredients reacting with the crab meat to form sulphides.

2. A package comprising a metal container, edible crab meat therein, and a lacquer coating covering the entire inner surface of the container, said lacquer coating having a glyptal resin base and being a non-electrical conductor, impervious to moisture of the crab meat and containing no ingredients reacting with the crab meat to form sulphides.

FRANK J. DONOVAN.